(12) United States Patent
Lacondemine et al.

(10) Patent No.: US 7,616,294 B2
(45) Date of Patent: Nov. 10, 2009

(54) LASER ANEMOMETRY WITH IMPROVED EYE SAFETY

(75) Inventors: Xavier Lacondemine, Valence (FR); Jean-Pierre Schlotterbeck, Rochefort-Samson (FR)

(73) Assignee: Thales, Neuilly/sur/Seine (FR)

( * ) Notice: Subject to any disclaimer, the term of this patent is extended or adjusted under 35 U.S.C. 154(b) by 0 days.

(21) Appl. No.: 12/067,531

(22) PCT Filed: Sep. 22, 2006

(86) PCT No.: PCT/EP2006/066619

§ 371 (c)(1),
(2), (4) Date: Jul. 24, 2008

(87) PCT Pub. No.: WO2007/033987

PCT Pub. Date: Mar. 29, 2007

(65) Prior Publication Data

US 2009/0033911 A1 Feb. 5, 2009

(30) Foreign Application Priority Data

Sep. 23, 2005 (FR) .................................. 05 09781

(51) Int. Cl.
*G01P 3/36* (2006.01)
(52) U.S. Cl. ...................................... 356/28; 356/28.5
(58) Field of Classification Search ....... 356/3.01–3.15, 356/4.01–4.1, 5.01–5.15, 6–22, 128, 128.5, 356/141.1, 141.2, 141.3
See application file for complete search history.

(56) References Cited

U.S. PATENT DOCUMENTS

| | | | |
|---|---|---|---|
| 3,984,685 A | 10/1976 | Fletcher et al. | |
| 5,313,263 A | 5/1994 | Abbiss et al. | |
| 2001/0009458 A1* | 7/2001 | Asaka et al. | ................ 356/28.5 |
| 2005/0278098 A1* | 12/2005 | Breed | ........................... 701/45 |

* cited by examiner

*Primary Examiner*—Thomas H Tarcza
*Assistant Examiner*—Luke D Ratcliffe
(74) *Attorney, Agent, or Firm*—Lowe Hauptman Ham & Berner, LLP

(57) ABSTRACT

The invention relates to an optical measurement device intended for determining a relative velocity vector $\vec{v}$ of a carrier, such as an aircraft, with respect to a reference medium MILREF. The device includes an optical signal system EMIREC, delivering an optical signal Sinc that follows a direction called the line of sight LDV and is concentrated in a focusing zone ZOF, and means for displacing the focusing zone ZOF in the reference medium MILREF. According to the invention, the means for displacing the focusing zone ZOF act on the orientation of the line of sight LDV, subjecting it to a known movement, with a nonzero speed, a processing unit UTR determines the vector $\vec{v}$ in at least one "search" phase based on an identification with an expected waveform of the variation in frequency of an electrical signal as a function of the orientation of the line of sight LDV in order to determine an approximate value of $\vec{v}$, followed by a "tracking" phase based on an iterative validation of values of $\vec{v}$ close to the approximate value of $\vec{v}$.

15 Claims, 4 Drawing Sheets

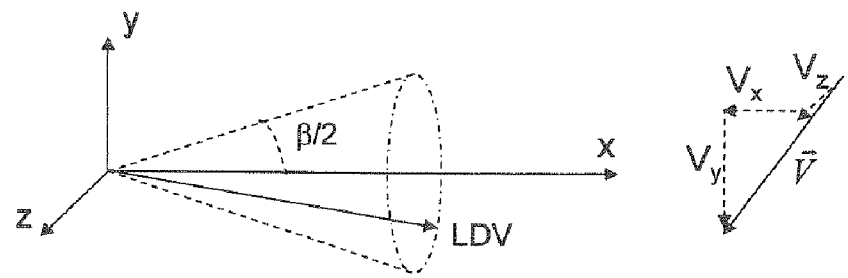
FIG.3a
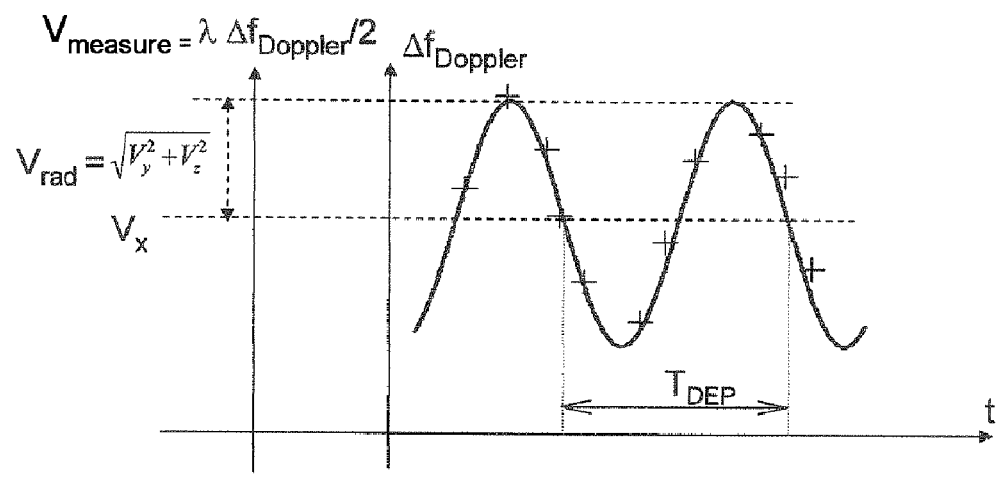
FIG.3b
FIG.3

LASER ANEMOMETRY WITH IMPROVED EYE SAFETY

CROSS-REFERENCE TO RELATED APPLICATIONS

The present Application is based on International Application No. PCT/EP2006/066619, filed on Sep. 22, 2006, which in turn corresponds to French Application No. 0509781, filed on Sep. 23, 2005, and priority is hereby claimed under 35 USC §119 based on these applications. Each of these applications are hereby incorporated by reference in their entirety into the present application.

FIELD OF THE INVENTION

The invention relates to an optical measurement device intended in particular for determining the speed of a carrier, such as an aircraft, relative to a mass of air.

BACKGROUND OF THE INVENTION

An optical measuring device relies on a technique consisting in measuring the frequency shift, representative of the speed relative to the air, between a laser beam emitted in the atmosphere and the beam backscattered by the natural aerosols in the air, these aerosols being used as wind field tracers. This technique is referred to as longitudinal laser Doppler anemometry since the frequency shift that results from the Doppler effect is directly proportional to the projection of the velocity vector on the line of sight.

The useful information carried by the Doppler frequency shift, hereinafter called the Doppler shift, is obtained by carrying out coherent-type detection: a beam coming from a coherent light source, for example a laser, is split into two beams. A first beam, called signal beam, is sent into the measurement zone and a second beam, called reference beam or local oscillator, constitutes a reference for detecting the Doppler shift.

The aerosols naturally present in the atmosphere backscatter the light of the signal beam, producing a signal backscattered by the medium, the frequency of which undergoes a Doppler shift $\Delta f_{Doppler}$ relative to that of the incident light. The signal backscattered by the medium interferes with the reference beam on the photosensitive surface of a detector. The frequency of the electrical signal delivered by the detector corresponds to the difference $\Delta f_{Doppler}$ between the frequency of the backscattered signal and the frequency of the reference beam, and from this a measurement of the relative speed of the aircraft, i.e. relative to the medium, is deduced knowing that the expression linking these two quantities is the following:

$$\Delta f_{Doppler} = 2v/\lambda \quad (A)$$

v being the projection, on the line of sight of the laser, of the velocity vector of the aircraft relative to the ambient medium (the atmosphere); and $\lambda$ being the wavelength of the emitted beam in the medium.

The components of the velocity vector $\vec{V}$ of the aircraft relative to the ambient medium are determined by measuring, possibly sequentially, projections of the velocity vector of the aircraft relative to the ambient medium in at least three non-coplanar directions.

FIG. 1 shows a block diagram of a device for optically measuring the Doppler shift $\Delta f_{Doppler}$, constituting the prior art of a heterodyne laser anemometer.

The device of FIG. 1 comprises a laser unit ULAS_A 10 delivering a light beam as input to a splitter unit USEP_A 20 delivering a signal light beam Fs as input to an optical signal transceiver system EMIREC 50 and a reference light beam Fr as input to an optical coupler MEL 30.

The laser unit ULAS_A comprises a radiation source and an optical device for spatially shaping the radiation emitted by the source. The laser unit ULAS_A produces a light beam, the wavelength $\lambda$ of which is for example 1.55 µm, this being a wavelength commonly employed in the optical telecommunications field as the atmosphere is relatively transparent at said wavelength.

The various constituents of the laser unit ULAS_A are not shown in FIG. 1.

The optical signal transceiver system EMIREC comprises in series an optical signal amplifier BOOS 53, a splitter unit USEP_B 54 and a displacement unit UDP 55 delivering an optical power signal Sinc focused in a focusing zone ZOF within the reference medium MILREF 60. The optical signal transceiver system EMIREC may also include an optical signal frequency shifter DEF 51, for example an acoustooptic modulator, which shifts the frequency of the beam that is applied to it by around one hundred megahertz.

The displacement unit UDP is characterized by an optical focus $F_{opt}$ and an optical axis denoted by X, these being shown more explicitly in FIG. 2. The term "line of sight" LDV is given to the axis joining the optical focus $F_{opt}$ to the center of the focusing zone ZOF where the optical power signal Sinc is focused. The YZ plane is normal to the X axis.

The orientation of the line of sight LDV, which is also the preferential orientation of the optical power signal Sinc emerging from the displacement unit UDP, may be controlled. This is also the case for the distance separating the focus $F_{opt}$ from the center of the focusing zone ZOF, as shown in FIG. 2.

The splitter unit USEP_B comprises for example, in series, a polarization splitting coupler followed by a two-way optical link. The various constituents of the splitter unit USEP_B are not shown in FIG. 1.

The displacement unit UDP captures light rays Sr backscattered by the reference medium MILREF in a specified direction.

The backscattered light rays Sr may possibly have a Doppler shift $\Delta f_{Doppler}$ generated by the medium MILREF relative to the incident beam Sinc. The backscattered light rays Sr are captured by the displacement unit UDP—they take the form of a backscattered signal beam Sr, also called a "light echo", which is transported through the splitter unit USEP_B before entering the optical mixing coupler MEL.

The optical mixing coupler MEL receives, on a first input, the reference light beam Fr coming from the coupler USEP_A and, on a second input, the backscattered signal beam Sr coming from the splitter unit USEP_B. The optical mixing coupler MEL mixes the two optical signals applied to its two inputs, which produces periodic beating on the photosensitive surface of a detector DET 40.

The detector DET delivers an electrical signal when a light beam of wavelength $\lambda$ is applied on its sensitive surface. The electrical beat signal produced by the detector DET, when its sensitive surface is illuminated by the periodic beating, varies at the same frequency as the periodic beating.

A signal processing unit UTR 70 receives the electrical beat signal resulting from the beating between the reference beam Fr and the backscattered beam Sr and enables its Doppler frequency $\Delta f_{Doppler}$ to be estimated.

The measurement of the projection on the line of sight LDV of the aircraft's relative velocity vector with respect to the medium $\vec{V}$ is derived from the measurement of the Doppler shift $\Delta f_{Doppler}$.

FIG. 2 details the operation of a displacement unit UDP 57 comprising an optical focusing system SOF 56 and a deflection unit UD.

The optical focusing system SOF 56 controls the value of the distance between the focusing zone ZOF of the optical power signal Sinc and the focus $F_{opt}$ the displacement unit UDP along the direction of the line of sight LDV. The optical focusing system SOF may for example be an optic of variable focal length, the value of the focal length being, in this case, determined by means of an electrical focusing control CEF.

The deflection unit UD controls the orientation of the line of sight LDV of the optical power signal Sinc. The deflection unit UD may for example be a prism rotating about the optical axis of the optical focusing system SOF. The movement of the prism is for example controlled by means of an electrical scan control signal CEB. The control signal CEB sent to the deflection unit UD acts on the orientation of the line of sight LDV and consequently on the position of the focusing zone ZOF in the reference medium MILREF.

In the prior art, a device for measuring the velocity vector $\vec{V}$, similar to that shown in FIG. 1, performs an elementary measurement of a projection of $\vec{V}$ along at least three selected, noncoplanar, elementary orientations of the line of sight LDV. In this case, the elementary measurements are performed sequentially and the line of sight LDV is kept unchanged in each of the three selected elementary orientations of the line of sight LDV during the elementary measurement. The determination of the velocity vector $\vec{V}$ is deduced directly from the elementary measurements by a geometric calculation that depends only on the elementary orientations of the line of sight LDV. The movement of the line of sight LDV between the measurements serves to rally, rapidly and in succession, the elementary orientations of the line of sight LDV.

One of the main figures of merit of the anemometer shown in FIG. 1 is the signal-to-noise ratio SNR measured on the output of the detector DET. The higher the SNR, the easier it is to perform the anemometric measurement. The SNR is higher the greater the amount of energy of the light echo Sr arriving on the detector of the detection unit UDET.

For an optical power signal Sinc of given energy incident in the medium MILREF, the light echo Sr is stronger the greater the concentration of efficiently backscattering aerosols of the medium MILREF in the focusing zone ZOF. Now, the aerosol concentration greatly decreases with altitude. Consequently, to be capable of operating just as well at high altitude, i.e. above 4 kilometers, as at low altitude, a laser anemometer must conventionally emit, in the medium MILREF, a strong optical intensity Sinc along a fixed direction, which poses safety problems, especially eye safety problems, in particular under flight conditions at low altitude.

SUMMARY OF THE INVENTION

One important objective of the invention is therefore to alleviate this eye safety problem.

To achieve this object, the invention proposes an optical probe measurement device for determining a relative velocity vector $\vec{V}$ of a carrier with respect to a reference medium MILREF, the carrier being equipped with the device, which comprises:

a laser unit ULAS_A (10) delivering a primary beam Fp, of wavelength λ, as input to a splitter unit USEP_A (20) delivering a signal light beam Fs as input to an optical signal system EMIREC (50), and a reference light beam Fr as input to a first input of an optical mixing coupler MEL (30);

the optical signal system EMIREC delivering, upon emission, an optical power signal Sinc that follows a direction called the line of sight LDV and is concentrated in a focusing zone ZOF and, moreover, receiving a light echo Sr sent back by the focusing zone ZOF and transporting it to a second input of the optical mixing coupler MEL;

means for displacing the focusing zone ZOF of the optical power signal Sinc in the reference medium MILREF;

the optical mixing coupler MEL delivering an optical beat signal comprising the sum of the reference light beam Fr and the light echo Sr;

a photosensitive detector DET receiving, on its sensitive surface, the optical beat signal coming from the optical mixing coupler MEL and delivering an electrical beat signal; and a processing unit UTR, receiving the electrical beat signal and delivering a measurement of $\vec{V}$, wherein the means for displacing the focusing zone ZOF act on the orientation of the line of sight LDV, subjecting it to a known movement, with a nonzero speed, and in that the processing unit UTR determines the vector $\vec{V}$ in at least one "search" phase based on an identification with an expected waveform of the variation in frequency of the electrical beat signal as a function of the orientation of the line of sight LDV in order to determine an approximate value of $\vec{V}$, followed by a "tracking" phase based on an iterative validation of values of $\vec{V}$ close to the approximate value of $\vec{V}$.

Compared with the prior art presented above, the invention has a number of advantages:

better sensitivity, allowing operation at high altitude with an incident optical signal Sinc of lower energy;

enhanced eye safety; and improved operating reliability.

The device according to the invention makes it possible to detect and measure a Doppler shift $\Delta f_{Doppler}$ despite a low SNR, in particular when the aerosol concentration of the reference medium MILREF is low. This advantage stems from the improvement in the sensitivity and accuracy of the measurement that the "tracking" phase provides compared with a device of the prior art. The incessant displacement of the focusing zone ZOF of the optical power signal Sinc, produced by the movement of the line of sight LDV, reduces the risk associated with the use of a laser unit, since it reduces the possible duration of illumination of a human eye. Finally, the jerk-free movement of the line of sight LDV improves the reliability of the device, especially the reliability of the displacement unit UDP.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein:

FIG. 3a shows a uniform circular displacement of the focusing zone ZOF of the optical power signal Sinc produced by a displacement unit UDP;

FIG. 3b shows the time variation of a Doppler shift $\Delta f_{Doppler}$ when the focusing zone ZOF of the optical power signal Sinc undergoes a uniform circular movement;

DETAILED DESCRIPTION OF THE DRAWINGS

Figure 1:
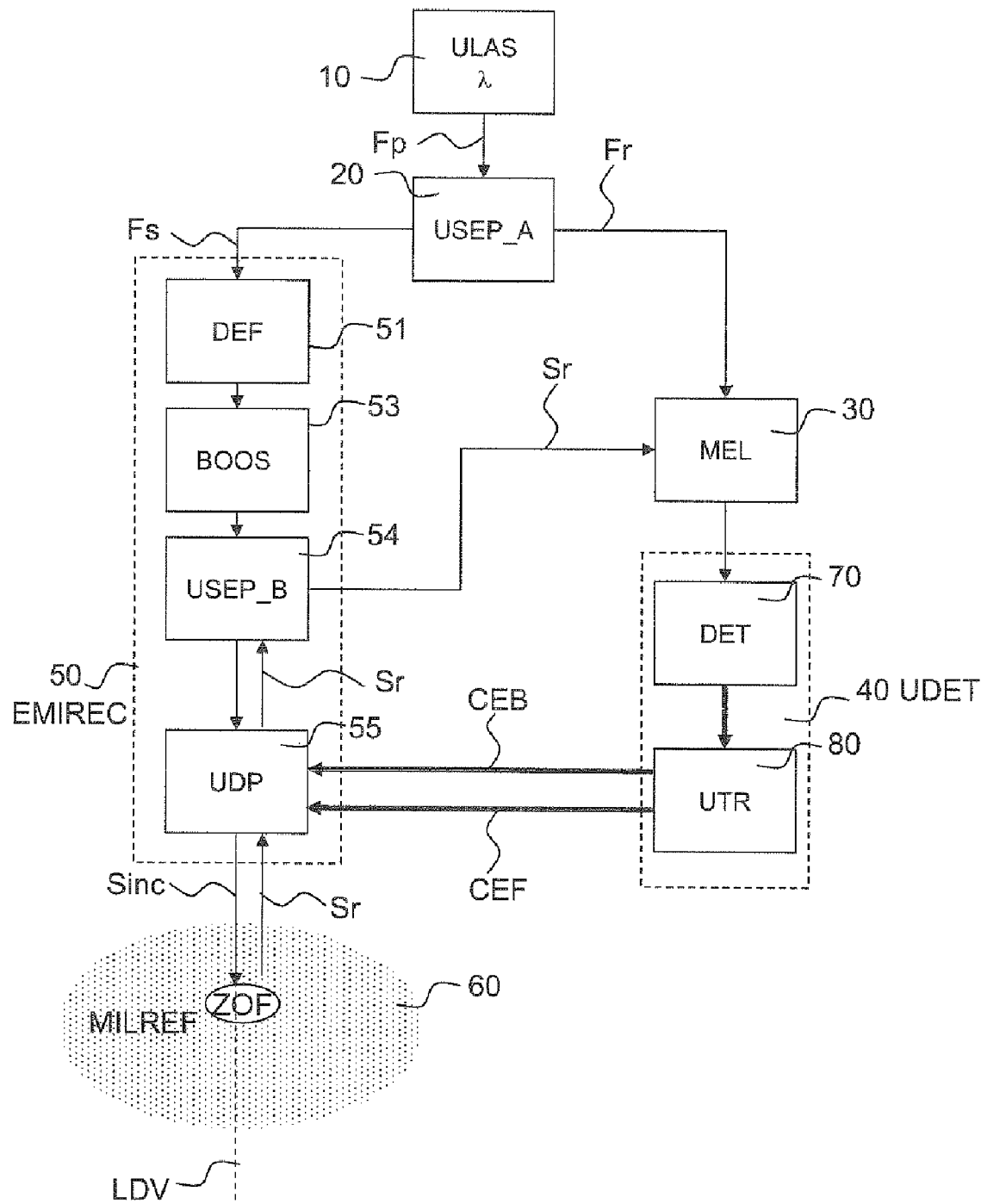
FIG. 1, already described, shows a schematic architecture of a laser anemometer according to the prior art.
Figure 2:
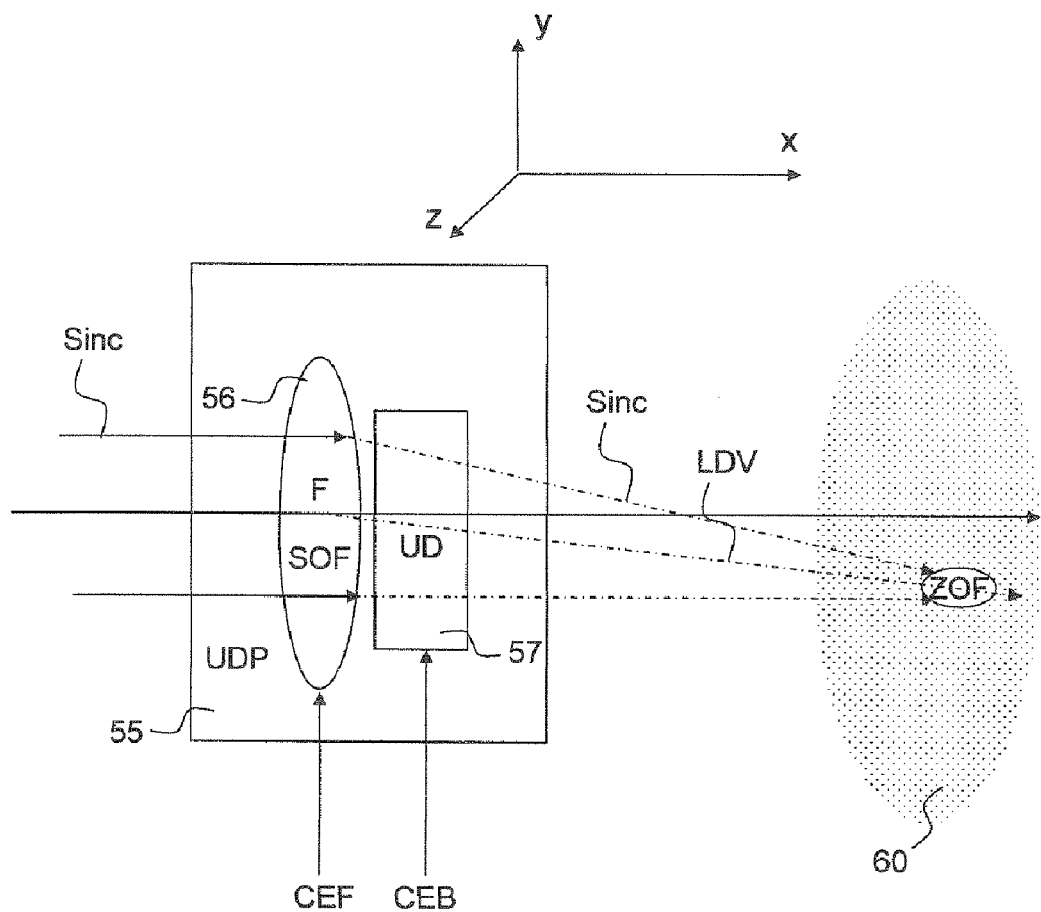
FIG. 2, already described, shows an example of the architecture of a displacement unit UDP for displacing the focusing zone ZOF of the optical power signal Sinc in the reference medium MILREF.

Advantageously, the means for displacing the focusing zone ZOF of the optical power signal Sinc comprise a displacement unit UDP impressing an orientation on the line of sight LDV of the optical power signal Sinc.

Advantageously, the laser unit ULAS comprises a pulsed laser source. In this situation, the peak power of the pulse emitted is generally such that, at low altitude, each pulse allows the velocity information to be extracted.

Advantageously, the laser unit ULAS comprises a continuous laser source.

FIG. 3a shows a movement impressed by the displacement unit UDP on the focusing zone ZOF of the optical power signal Sinc. For example, the movement is circular about the optical axis X of the optical system SOP, with a uniform speed and of period $T_{DEP}$. The line of sight LDV is displaced, in this case periodically, over a cone with, for example, a 60° apex angle β. When the anemometer is on board a carrier of the airplane type, the focusing zone ZOF of the optical power signal Sinc represents for example a volume of one cubic millimeter and is for example at a distance of fifty centimeters from the focus $F_{opt}$ of the displacement unit UDP.

The displacement unit UDP is for example a movable prism or a set of oscillating mirrors. In the first case, the displacement unit UDP comprises at least one movable prism, rotating about a fixed reference axis, and the orientation of the line of sight LDV is determined by the passage of the optical power signal Sinc through the movable prism. Advantageously, the fixed reference axis is parallel to the direction of movement of the carrier.

In the second case, the displacement unit UDP comprises at least two oscillating mirrors and the orientation of the line of sight LDV is determined by reflections of the optical power signal Sinc off the oscillating mirrors.

The displacement unit UDP also acts on the distance separating the focusing zone ZOF from the displacement unit UDP.

For each orientation of the line of sight LDV, the anemometric measurement corresponds to a projection of $\vec{V}$ along the direction of the line of sight LDV. In other words, for a constant vector $\vec{V}$, the movement impressed on the line of sight LDV produces a time variation of the detected Doppler shift $\Delta f_{Doppler}$.

FIG. 3b illustrates, for a constant velocity vector $\vec{V}$, the form of the time variation of the measurement of the detected Doppler shift $\Delta f_{Doppler}$ when the focusing zone ZOF of the optical power signal Sinc undergoes a periodic movement, here a circular movement of constant speed as described in FIG. 3a. The time variation of the corresponding detected Doppler shift $\Delta f_{Doppler}$ is also periodic with the same period.

Advantageously, the displacement unit UDP impresses a circular displacement of constant speed on the focusing zone ZOF.

The detected Doppler shift $\Delta f_{Doppler}$ may be expressed as a speed measurement thanks to the expression (A). Thus, the time variation of $V_{measure} = \lambda \Delta f_{Doppler}/2$ describes the time variation of the projection of the vector $\vec{V}$ on the line of sight LDV.

It may be shown that the time variation of $V_{measure}$ is related to the components of the vector $\vec{V}$. For example, in the case of the uniform circular displacement of the focusing zone ZOF, with a period $T_{DEP}$ identical to that shown in FIG. 3a, the time variation of $V_{measure}$ is expressed in the form of a sum of a DC component and a sinusoidal component of period $T_{DEP}$. The DC component is related to the component of $\vec{V}$ along the longitudinal axis and the amplitude of the sinusoidal function is related to the radial component of $\vec{V}$. The term "longitudinal axis" is understood to mean the mean direction taken by the line of sight LDV over the period $T_{DEP}$ and the term "radial component" is understood to mean the projection on a plane normal to the longitudinal axis defined above.

At low altitude, the light echo Sr generally has a level sufficient for the Doppler shift $\Delta f_{Doppler}$ to be measured with a high enough SNR. Over the course of time, a time variation of the Doppler shift $\Delta f_{Doppler}$ that is not too noisy may therefore be acquired.

Moreover, knowing $\vec{V}$ and the movement of the line of sight LDV, it is possible to determine a theoretical function F(t) delivering the Doppler shift value $\Delta f_{Doppler}$ as a function of time. Therefore, $V_{measure}$ is equal to $\lambda F(t)/2$ at any instant. Thus, conversely, by relying on identifying the time variation of the measurements $V_{measure}$ with the function F(t), the three components of $\vec{V}$ are obtained indirectly.

This method, also called "search phase", comprises at least the following four steps:

a first step for digital acquisition of at least three time sequences of the electrical beat signal corresponding to different orientations of the line of sight LDV, the time sequences having a duration such that the orientation of the line of sight LDV may be considered to be stationary over the acquisition period;

a second step for extracting the Doppler shift from the frequency measurement on each of the time sequences;

a third step for determining the theoretical Doppler shift modulation function according to the movement of the line of sight LDV; and a fourth step for identifying the time variation of the Doppler shifts with the theoretical modulation function.

For example, in the case of a uniform circular displacement of the focusing zone ZOF of the optical power signal Sinc about an axis X, it has already been seen that the theoretical function F(t) is expressed as a sum of a DC component and a sinusoidal component, of known period $T_{DEP}$. From the Doppler shift measurements, the most probable function F(t) is determined and then it is sought to obtain, on the one hand, the value of the DC component of the function F(t) and, on the other hand, the value of the amplitude and the phase of the sinusoidal component of the function F(t).

The device according to the invention takes digital measurements $V_{measure}$ over the course of time, the measurements being performed over sufficiently short durations for the movement of the line of sight LDV not to cause a displacement of the focusing zone ZOF which would disturb the measurement. This is because if the movement of the line of sight is perceptible during the acquisition, this movement acts directly on the Doppler shift and therefore on the resolution and the level of a Doppler frequency line (or peak) appearing on a frequency representation of the time sequence.

FIG. 3b shows the measurements $V_{measure}$ as a function of the acquisition start time of the sequences. The measurements $V_{measure}$ are represented by crosses. Plotted on the same figure, as a solid line, is the form of the function F(t). This curve is deduced from the measurements $V_{measure}$ by calculation, for example by means of regression algorithms.

The characteristics of the function F(t) make it possible to access the components of the vector $\vec{V}$ indirectly. However, this method usually produces only an approximate value of $\vec{V}$.

At high altitude, the light echo Sr is weak and, consequently, the level of the Doppler frequency line appearing on a frequency representation of a short time sequence is not sufficient to perform a direct measurement of the Doppler shift $\Delta f_{Doppler}$ in the same way as at low altitude, since the integration time is then insufficient. In this case, it appears advantageous to accumulate several spectra obtained from signal acquisitions carried out during the movement of the line of sight LDV. In order for the accumulation of measurements $V_{measure}$ to contribute to improving the level of the Doppler line, it is necessary beforehand to make the successive measurements of $V_{measure}$ coherent, so as to obviate the effects caused by the movement of the line of sight LDV.

The measurement of $\vec{V}$ using this method is also called the "tracking phase", as it may be likened to tracking, by maintaining, under conditions in which direct measurement is difficult, knowledge of the characteristics of a velocity vector $\vec{V}$ on the basis of a value taken previously by $\vec{V}$. This makes it possible in particular to measure the vector $\vec{V}$ at high altitude without increasing the energy of the optical power signal Sinc, or else at low altitude to improve the quality of the measurement precision.

The "tracking" phase comprises at least the following five steps:
- a first step consisting in digital acquisition of the electrical beat signal, the acquisition starting at a known time and having a duration such that the orientation of the line of sight LDV cannot be considered as stationary over the duration of the acquisition;
- a second step for generating assumptions about the probable value of the vector v at the start time of the acquisition;
- a third step for dividing the digital acquisition of the electrical beat signal into elementary sequences, the elementary sequences having a duration such that the orientation of the line of sight LDV may be considered to be stationary over the duration of the sequences;
- a fourth step for making the elementary sequences coherent so as to generate corrected elementary sequences. This coherence operation makes it possible to compensate for the effects of the movement of the line of sight LDV between the start times of the sequences, the coherence operation relying on the value of the vector v under one of the assumptions considered in the second step, the knowledge of the start time of each acquisition sequence and the knowledge of the movement of the line of sight LDV at any instant; and
- a fifth step for validating/invalidating the assumptions based on an evaluation of the spectral characteristics of the corrected elementary sequences.

Advantageously, the assumptions on the value of the vector $\vec{V}$ which are considered in the second step of the "tracking" phase are constructed from the approximate value of $\vec{V}$ obtained after the search step.

The coherence operation is carried out by numerically correcting the frequency spectra of the sequences as a function of the start time of the elementary sequences.

This coherence operation is performed by the processing unit UTR and amounts to integrating the electrical beat signal over a much longer time than that employed at low altitude, while still preserving mobility of the line of sight LDV.

The nature of the scan control signal CEB fed into the displacement unit UDP of the device according to the invention differs from that of the prior art. In the device according to the invention, the displacement unit UDP subjects the orientation of the line of sight LDV to a known movement, at nonzero speed, so that the detected Doppler shift $\Delta f_{Doppler}$ follows from the time function denoted by F(t), this being a modulation around a fixed frequency $Freq_{fixed}$.

In the case of the uniform circular movement, with a period $T_{DEP}$, of the focusing zone ZOF described in FIG. 3a, $Freq_{fixed}$ corresponds for example to the value of the projection of the velocity vector on the mean of the line of sight LDV, that is to say here on the X direction, and F(t) is a periodic function of time giving the value of the detected Doppler shift $\Delta f_{Doppler}$, which depends exclusively on $\vec{V}$ and on the direction of the line of sight LDV taken at the instant t. Knowing at any instant t the direction of the line of sight LDV, it is possible to determine the value of the function F(t) on the basis of an assumption about the value of the velocity vector $\vec{V}$.

Figure 4:
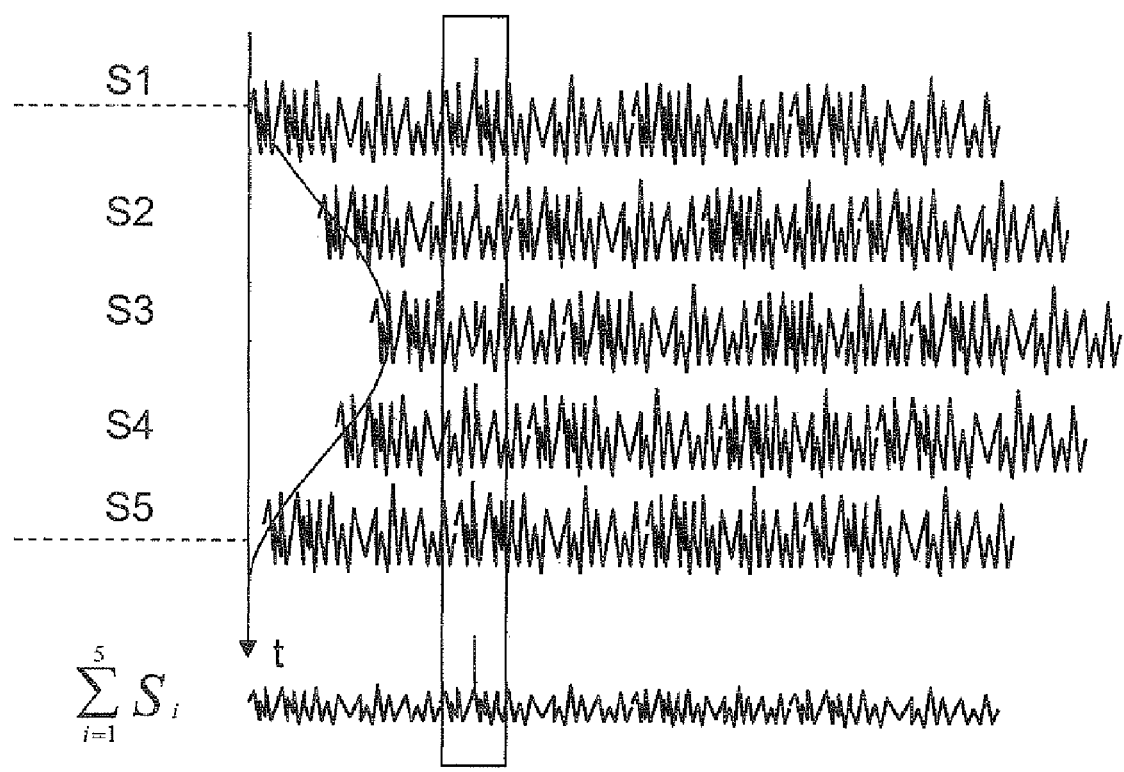
FIG. 4 depicts a graph of elementary spectra according to an embodiment of the disclosed invention.

FIG. 4 shows, plotted on a vertical time axis, the elementary spectra S1, S2, S3, S4, S5 corresponding to five elementary acquisitions of the electrical beat signal taken in succession over a short period, for example 10 µs, which corresponds for example to a small displacement of the line of sight LDV.

Under conditions in which the light echo Sr is weak, the spectral analysis does not allow direct detection of a frequency line corresponding to a Doppler shift on an elementary spectrum. If $t_1$ is the time of an elementary acquisition serving as reference, chosen from the five elementary acquisitions, and $t_i$ is the time of the ith elementary acquisition, the operation of making the various acquisitions coherent comprises individually shifting the abscissae of the ith-order elementary spectrum by the amount $F(t_i - t_1)$ in order to form a set of coherent elementary spectra.

Advantageously, the fifth step of the "tracking" phase comprises the detection of a narrow strong frequency line on an accumulation of frequency spectra of the electrical beat signals brought into coherence.

After being brought into coherence, the elementary spectra are accumulated so as to constitute a resultant spectrum. If the resultant spectrum comprises a single narrow strong frequency line, the assumption made about $\vec{V}$ is verified. Conversely, if the assumption about $\vec{V}$ is not verified, that is to say if the actual velocity vector $\vec{V}$ is far from the expected velocity vector $\vec{V}$, then the resultant spectrum comprises a weak frequency-dispersed frequency line. The validation/invalidation of the assumption made about the value of the velocity vector $\vec{V}$, which led to a value of F(t) being established, is carried out a posteriori.

By relying on the computing power of the processing unit UTR, there is the advantage of studying in parallel many assumptions made so as to offer the best tracking/precision performance.

Advantageously, the last three steps of the "tracking" phase may be repeated in loop mode until one of the assumptions considered in the second step is validated in the fifth step of the "tracking" phase.

The optical probe measurement device described above may also be fitted to a ground installation, such as a wind-power generator for measuring the relative wind.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. An optical probe measurement device for determining a relative velocity vector $\vec{v}$ of a carrier with respect to a reference medium, the carrier being equipped with the device, comprising:
    a laser unit delivering a primary beam, of a wavelength λ, as input to a splitter unit delivering a signal light beam as input to an optical signal system, and a reference light beam as input to a first input of an optical mixing coupler;
    the optical signal system delivering, upon emission, an optical power signal that follows a direction and is concentrated in a focusing zone and, receiving a light echo sent back by the focusing zone and transporting it to a second input of the optical mixing coupler;
    means for displacing the focusing zone of the optical power signal in the reference medium;
    the optical mixing coupler delivering an optical beat signal comprising the sum of the reference light beam and the light echo;
    a photosensitive detector receiving, on its sensitive surface, the optical beat signal coming from the optical mixing coupler and delivering an electrical beat signal; and
    a processing unit, receiving the electrical beat signal and delivering a measurement of $\vec{v}$,
    wherein the means for displacing the focusing zone act on the orientation of the line of sight, subjecting it to a known movement, with a nonzero speed, and in that the processing unit determines the vector $\vec{v}$ in at least one search phase based on an identification with an expected waveform of the variation in frequency of the electrical beat signal as a function of the orientation of the line of sight in order to determine an approximate value of $\vec{v}$, followed by a tracking phase based on an iterative validation of values of $\vec{v}$ close to the approximate value of $\vec{v}$;
    wherein the search phase comprises:
        a first step for digital acquisition of at least three time sequences of the electrical beat signal corresponding to different orientations of the line of sight, the time sequences having a duration such that the orientation of the line of sight may be considered to be stationary over the acquisition period;
        a second step for extracting the Doppler shift from the frequency measurement on each of the time sequences;
        a third step for determining the theoretical Doppler shift modulation function according to the movement of the line of sight; and
        a fourth step for identifying the time variation of the Doppler shifts with the theoretical modulation function.

2. The device as claimed in claim 1, wherein the tracking phase comprises the following steps:
    a first step consisting in digital acquisition of the electrical beat signal, the acquisition starting at a known time and having a duration such that the orientation of the line of sight cannot be considered as stationary over the duration of the acquisition;
    a second step for generating assumptions about the probable value of the vector $\vec{v}$ at the start time of the acquisition;
    a third step for dividing the digital acquisition of the electrical beat signal into elementary sequences, the elementary sequences having a duration such that the orientation of the line of sight may be considered to be stationary over the duration of the sequences;
    a fourth step for making the elementary sequences coherent so as to generate corrected elementary sequences, wherein coherence step makes it possible to compensate for the effects of the movement of the line of sight between the start times of the sequences, the coherence step relying on the value of the vector $\vec{v}$ under one of the assumptions considered in the second step, the knowledge of the start time of each acquisition sequence and the knowledge of the movement of the line of sight at any instant; and
    a fifth step for validating/invalidating the assumptions based on an evaluation of the spectral characteristics of the corrected elementary sequences.

3. The device as claimed claim 2, wherein the assumptions on the value of the vector $\vec{v}$ which are considered in the second step of the tracking phase are constructed from the approximate value of $\vec{v}$ obtained after the search step.

4. The device as claimed in claim 2, wherein the last three steps of the tracking phase may be repeated in loop mode until one of the assumptions considered in the second step is validated in the fifth step of the tracking phase.

5. The device as claimed in claim 2, wherein the fifth step of the tracking phase comprises the detection of a narrow strong frequency line on an accumulation of frequency spectra of the electrical beat signals brought into coherence.

6. The device as claimed in claim 1, wherein the means for displacing the focusing zone of the optical power signal comprise a displacement unit impressing an orientation on the line of sight LDV of the optical power signal.

7. The device as claimed claim 6, wherein the displacement unit comprises at least two oscillating mirrors and in that the orientation of the line of sight is determined by reflections of the optical power signal off the oscillating mirrors.

8. The device as claimed in claim 7, wherein the displacement unit comprises at least one movable prism, rotating about a fixed reference axis, and in that the orientation of the line of sight is determined by the passage of the optical power signal through the movable prism.

9. The device as claimed in claim 8, wherein the fixed reference axis is parallel to the direction of movement of the carrier.

10. The device as claimed in claim 9, wherein the displacement unit impresses a circular displacement of constant speed on the focusing zone.

11. The device as claimed in claim 6, wherein the displacement unit also acts on the distance separating the focusing zone from the displacement unit.

12. The device as claimed in claim 1, wherein the laser unit of the optical probe measurement device is a pulsed laser source.

13. The device as claimed in claim 1, wherein the laser unit of the optical probe measurement device is a continuous laser source.

14. The device as claimed in claim 1, wherein the carrier is a ground installation.

15. An optical probe measurement device for determining a relative velocity vector $\vec{v}$ of a carrier with respect to a reference medium, the carrier being equipped with the device, comprising:
   a laser unit delivering a primary beam, of a wavelength λ, as input to a splitter unit delivering a signal light beam as input to an optical signal system, and a reference light beam as input to a first input of an optical mixing coupler, wherein the optical signal system is configured to deliver, upon emission, an optical power signal that follows a direction and is concentrated in a focusing zone and, receiving a light echo sent back by the focusing zone and transporting it to a second input of the optical mixing coupler, and wherein the optical mixing coupler is configured to deliver an optical beat signal comprising the sum of the reference light beam and the light echo;
   means for displacing the focusing zone of the optical power signal in the reference medium;
   a photosensitive detector configured to receive, on its sensitive surface, the optical beat signal coming from the optical mixing coupler and delivering an electrical beat signal; and
   a processing unit configured to receive the electrical beat signal and deliver a measurement of $\vec{v}$,
   wherein the means for displacing the focusing zone act on the orientation of the line of sight, subjecting it to a known movement, with a nonzero speed, and wherein the processing unit is configured to determine the vector $\vec{v}$ in at least one search phase based on an identification with an expected waveform of the variation in frequency of the electrical beat signal as a function of the orientation of the line of sight in order to determine an approximate value of $\vec{v}$, followed by a tracking phase based on an iterative validation of values of $\vec{v}$ close to the approximate value of $\vec{v}$;
   wherein the tracking phase comprises:
      a first step consisting in digital acquisition of the electrical beat signal, the acquisition starting at a known time and having a duration such that the orientation of the line of sight cannot be considered as stationary over the duration of the acquisition;
      a second step for generating assumptions about the probable value of the vector $\vec{v}$ at the start time of the acquisition;
      a third step for dividing the digital acquisition of the electrical beat signal into elementary sequences, the elementary sequences having a duration such that the orientation of the line of sight may be considered to be stationary over the duration of the sequences;
      a fourth step for making the elementary sequences coherent so as to generate corrected elementary sequences, wherein coherence step makes it possible to compensate for the effects of the movement of the line of sight between the start times of the sequences, the coherence step relying on the value of the vector $\vec{v}$ under one of the assumptions considered in the second step, the knowledge of the start time of each acquisition sequence and the knowledge of the movement of the line of sight at any instant; and
      a fifth step for validating/invalidating the assumptions based on an evaluation of the spectral characteristics of the corrected elementary sequences.

* * * * *